(12) United States Patent
Schmitt

(10) Patent No.: US 6,338,392 B1
(45) Date of Patent: Jan. 15, 2002

(54) METHOD AND ARRANGEMENT FOR CONTROLLING A DRIVE UNIT

(75) Inventor: Johannes Schmitt, Markgröningen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/514,316

(22) Filed: Feb. 28, 2000

(30) Foreign Application Priority Data

Mar. 26, 1999 (DE) .......................... 199 13 824

(51) Int. Cl.[7] .................................. G06G 7/76
(52) U.S. Cl. ........................... 180/197; 701/86
(58) Field of Search ................... 180/197, 284; 701/84, 86, 91; 123/335

(56) References Cited

U.S. PATENT DOCUMENTS

| 4,311,123 A | | 1/1982 | Glöckler et al. |
| 4,872,373 A | * | 10/1989 | Ouchi et al. .................. 74/711 |
| 4,985,836 A | * | 1/1991 | Hashiguchi et al. ........ 180/197 |
| 5,048,482 A | | 9/1991 | Kratt et al. |
| 5,732,380 A | * | 3/1998 | Iwata .......................... 701/85 |

* cited by examiner

Primary Examiner—Brian L. Johnson
Assistant Examiner—Avraham H. Lerner
(74) Attorney, Agent, or Firm—Walter Ottesen

(57) ABSTRACT

A method and an arrangement for controlling a drive unit wherein a quantity, which represents the torque, is limited by a limiting value during the transition from the overrun phase of the drive unit into the traction phase. The limiting value is determined from the slip of at least one drive wheel in the overrun phase.

10 Claims, 4 Drawing Sheets

METHOD AND ARRANGEMENT FOR CONTROLLING A DRIVE UNIT

BACKGROUND OF THE INVENTION

In some vehicles, unstable driving performance can occur in some operating situations during the transition from the overrun phase or from the idle phase into the traction phase (drive phase) of a drive unit of a motor vehicle. In the extreme case, this can lead to an oversteering of the vehicle.

From U.S. Pat. No. 5,048,482, it is known to provide a time-dependent increasing limit rpm at the transition to improve the same. This limit rpm cannot be exceeded by the rpm of the drive unit. In this way, the transition in the traction phase is improved in several situations especially for a fault in the area of the air throughput to the adjusting device influencing an engine.

After ending an overrun operation, when pressing the accelerator pedal, it is known from U.S. Pat. No. 4,311,123 to increase the fuel quantity supplied to an engine in accordance with a selectable time function. Here too, a smooth transition into normal driving operation is of primary importance. However, measures which avoid a possible occurrence of unstable driving performance are not described for the transition from the overrun phase of operation or idle phase of operation into the traction phase.

SUMMARY OF THE INVENTION

It is an object of the invention to provide measures with which an unstable driving performance is avoided which occurs during the transition into the traction phase of a drive unit.

The method of the invention is for controlling a drive unit of a motor vehicle and includes the steps of: detecting a variable representing the torque of the drive unit; controlling the variable on the basis of a command of the driver of the motor vehicle; detecting the slip of at least one drive wheel in one of the following operating phases: overrun phase, idle phase and braking phase; determining a limiting value for the variable in dependence upon the slip; and, limiting the variable to the limiting value at or near a transition from one of the operating phases into a traction phase of the drive unit.

The procedure of the invention of limiting an operating variable during the transition from overrun operation or idle operation into traction operation (load change) in dependence upon the drag slip and/or brake slip during the overrun phase reduces the danger of instability during a load change because the driver cannot now use the entire engine torque. The operating variable which is limited determines the torque of the drive unit. In this way, the danger of oversteering the vehicle because of the instability is reduced. An overall improvement of the driving stability of the vehicle during a load change is the result.

The limiting of the torque is especially advantageous in systems wherein disengagement of the clutch takes place in the overrun operation and wherein engagement of the clutch takes place again when the accelerator pedal is depressed. In control concepts of this kind, the then occurring instability during reengagement is considerably reduced.

Corresponding advantages are also attained when, in the overrun mode of operation, an anti-blocking controller is active or a braking phase is present. In this case, the braking slip during the overrun phase or braking operation is the starting point of the limiting value.

It is especially advantageous that the limiting value is increased in accordance with a time function so that the total torque of the drive unit is again made available to the driver little by little and, in this way, the dynamic of the vehicle is unaffected.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
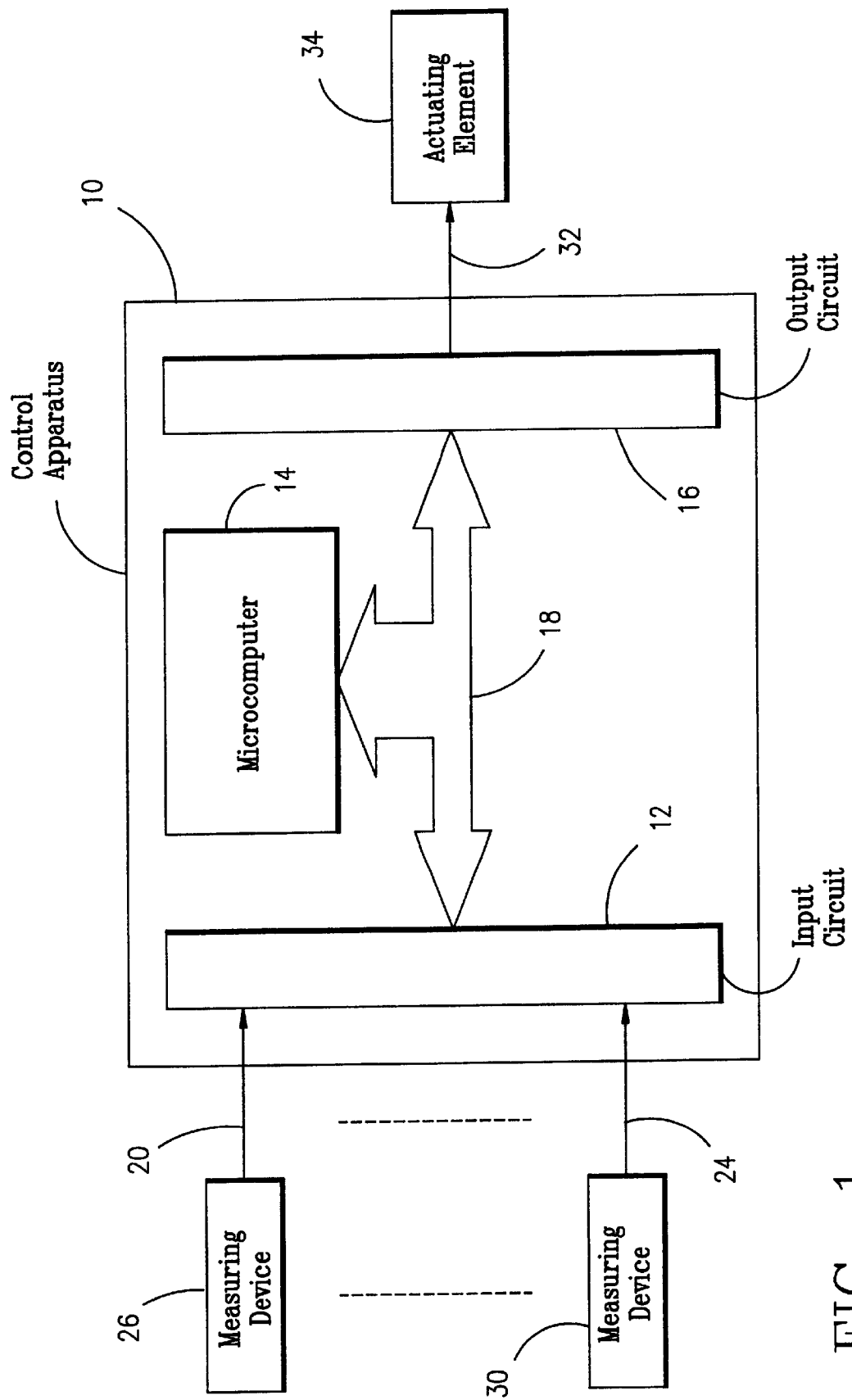
FIG. 1 is an overview block circuit diagram of a control arrangement for a drive unit of a vehicle.

FIG. 1 shows a control apparatus 10 which includes at least one input circuit 12, at least one microcomputer 14, and at least one output circuit 16. These elements are connected to each other for data exchange by a communication system 18. Input lines lead to the input circuit via which the signals are transmitted which represent operating variables or from which operation variables can be derived. In the following, only input lines 20 to 24 are shown for the sake of clarity and these input lines supply signals representing wheel velocities. These velocities are detected by measuring devices 26 to 30.

The wheel velocity signals are evaluated in connection with the determination of the limiting value. In addition, and depending upon the embodiment, additional variables are supplied.

In the preferred embodiment, the control apparatus 10 is the control apparatus for the drive unit which is preferably an internal combustion engine. For this reason, as additional input variables signals are provided which represent the engine rpm, the engine load, the throttle flap angle, the accelerator pedal position, et cetera. The control apparatus 10 outputs control variables via the output circuit 16 and the output lines connected thereto which are in the context of the closed-loop controls executed by the control apparatus 10.

In the preferred embodiment, at least one output line 32 leads to at least one actuating element 34 which influences the torque of the engine. In the preferred embodiment, the actuating element 34 is a throttle flap of the engine which is actuated by a corresponding actuating variable via the line 32.

In addition to the actuation of the throttle flap, the ignition angle and/or an influencing of the metering of fuel is available for the control in a throttle-driven internal combustion engine. In a diesel engine and/or for an unthrottled-driven internal combustion engine, the fuel mass to be injected is the primary actuating variable for influencing the torque.

The description which follows is to be correspondingly applied to electric motors and here, for example, the motor current is the actuating variable outputted by the control apparatus 10.

In the preferred embodiment, the control apparatus 10 defines a control apparatus for controlling the drive unit. In the context of the programs, which are implemented in the microcomputer 14 of the control apparatus 10, a control of the drive unit is executed in accordance with the driver command. Accordingly, in the preferred embodiment, a desired position for the throttle flap is inputted on the basis of the accelerator pedal position. This desired position is controlled to in the context of a position control loop while considering the actual position of the throttle flap.

In other preferred embodiments, the desired torque value is formed from the accelerator pedal position while considering other operating variables as needed. The desired torque value is converted into an actuating variable while considering, as may be required, the measured or computed actual torque and this actuating variable is outputted via the line 32 to control the drive unit and to adjust the torque of the drive unit to the pregiven desired torque In lieu of the throttle flap position or torque (for example, the indicated torque or the output torque), the control of the drive unit in other embodiments is executed on the basis of a variable representing the power of the drive unit or the fuel mass to be injected, et cetera. All these variables are referred to in the following under the term of a variable representing the torque of the drive unit.

The vehicle is in the overrun mode of operation when the drive unit is primarily driven by the drive train, for example, when the accelerator pedal is released. In this mode, and as a consequence of the driven drive unit, the wheel velocities (at least of the drive wheels) are slowed so that these wheels have a lesser velocity compared to the velocity of the free-running wheels. This performance of the drive wheels in the overrun mode of operation is known as drag slip. The magnitude of the slip can be determined on the basis of a comparison of the velocities of the driven wheels to the non-driven wheels. As a rule, the slip value is determined on the basis of a comparison of the wheel velocities of the driven wheels to the non-driven wheels. For this reason, the wheel slip of the drive wheels is negative in the overrun mode of operation and is positive in the traction mode. In the preferred embodiment, the clutch is disengaged in the overrun phase, that is, the force connection between the drive unit and the wheels of the drive train is interrupted. When the accelerator pedal is depressed, the force connection is again engaged and this can lead to instability of the vehicle. In the disengaged state, the drive wheels likewise run free so that no drag torque occurs. The drag torque occurs before disengagement and again after engagement of the clutch until the traction phase begins via the torque increase. In other advantageous embodiments, no disengagement of the clutch takes place so that drag slip occurs during the entire overrun phase.

If the driver brakes during the overrun phase, then, for forward-wheel drive vehicles, the drag torque increases and, for rear-wheel driven vehicles, brake slip is built up in lieu of the drag slip because the forward wheels run slower than the rearward wheels. The braking slip or drag slip is high during an ABS control phase.

To improve the load change performance, that is, to improve the transition from the overrun phase (or, in the disengaged condition, from the idle phase) into the traction phase, the operating variable, which influences the torque, is limited. For this purpose, a limiting value for the operating variable (especially for the desired value thereof) is determined during the overrun phase. This takes place in the preferred embodiment on the basis of characteristic fields or characteristic lines which contain a limiting value for the operating variable (throttle flap position, torque or motor power) at least in dependence upon the magnitude of the wheel slip. In addition to wheel slip, and in a preferred embodiment, the vehicle speed or a variable approaching the vehicle speed is also considered.

Different procedures are used for the determination of the limiting value from the wheel slip depending upon the embodiment. On the one hand, the maximum slip during an overrun phase is determined or a slip value is determined which is present directly in advance of the load change or a slip value is determined which was present directly in advance of disengaging the clutch. In the preferred embodiment, the slip value which is present directly before the load change (after engaging the clutch, as required) forms the basis of the determination of the limiting value.

If the vehicle changes from the overrun phase into the traction phase (this can, for example, be detected when a zero torque characteristic line of the operating variable is exceeded), the desired value which is pregiven by the driver or the adjusted actual value of the operating variable is limited to the limiting value pregiven by the wheel slip. The limiting value is then increased in accordance with a time function, for example, in accordance with a linear time function so that little by little a larger torque is made available to the driver. The increase of the limiting value takes place up to a maximum value which is no longer limited. The time function is then determined in such a manner that no significant adverse effect on the dynamic takes place by the limiting and so that instabilities are effectively avoided.

In the preferred embodiment, a desired throttle angle is inputted by the driver and a control to this angle takes place by actuating the throttle flap via a position controller. With a load change, a limit angle is determined for the throttle flap position in dependence upon the magnitude of the wheel slip. This limit angle limits the desired value inputted by the driver, for example, via a minimum value selection. After the change of load, the limiting value is increased linearly as a function of time up to the maximum possible desired value.

In the preferred embodiment, the wheel slip is determined by a comparison of the speed of a selected drive wheel (selected, for example, via a maximum value selection) and a selected free-rolling wheel (for example, correspondingly selected) or on the basis of the mean value of the speeds of the drive wheels and the mean value of the speeds of the free-rolling wheels.

In the preferred embodiment, the realization of the described procedure takes place as a computer program. The flowcharts of FIGS. 2 and 3 outline such programs. These programs are run through at pregiven time points.

Figure 2:
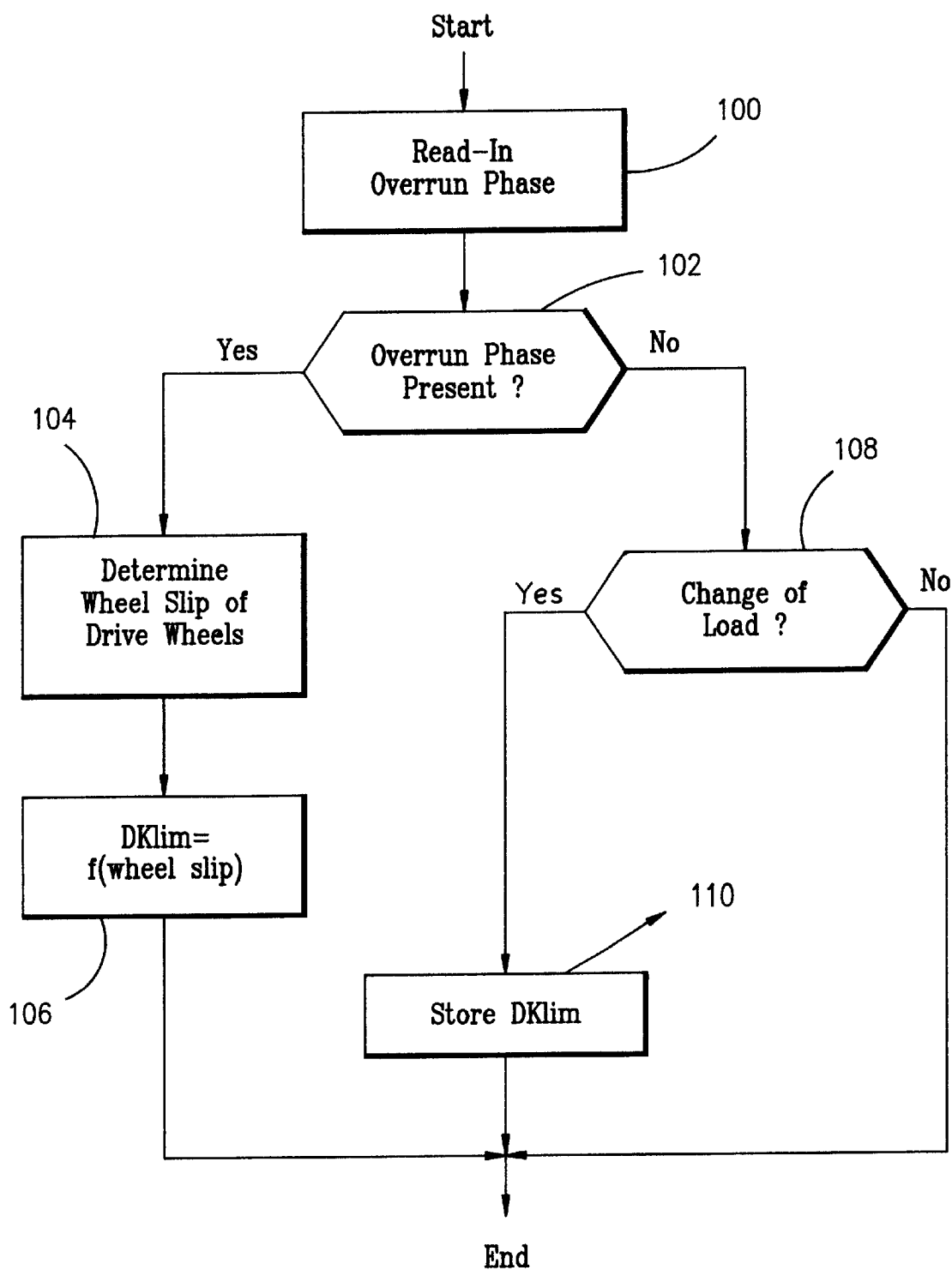
FIG. 2 shows a first preferred embodiment of the method of the invention as a flowchart which shows a realization of the method as a computer program.

After the start of the program shown in FIG. 2, a flag, which characterizes the overrun phase, is read in in step 100. This flag is set when the vehicle is in the overrun phase (for example, when there is a drop below the zero torque characteristic line, when the accelerator pedal is released, et cetera). The overrun phase always occurs when the drive unit is driven by the drive train.

In step 102, a check is made as to whether the overrun phase is present. If this is the case, then, in accordance with step 104, the wheel slip of the drive wheels is determined, for example, in that the mean drive wheel rpm is compared to the mean rpm of the non-driven wheels. Thereupon, in step 106, the limiting value DKlim is determined at least in accordance with the magnitude of the determined wheel slip and a pregiven characteristic line or a pregiven characteristic field. After step 106, the program is ended and repeated at the next time point.

If the result in step 102 is that no overrun phase is present, then a check is made in step 108 as to whether a change of load has just taken place, that is, whether, in the last program runthrough, the overrun phase was still present. If this is the case, then, in accordance with step 110, the limiting value DKlim (determined in the last program runthrough) is stored; otherwise, the program is ended as also after step 110.

Figure 3:
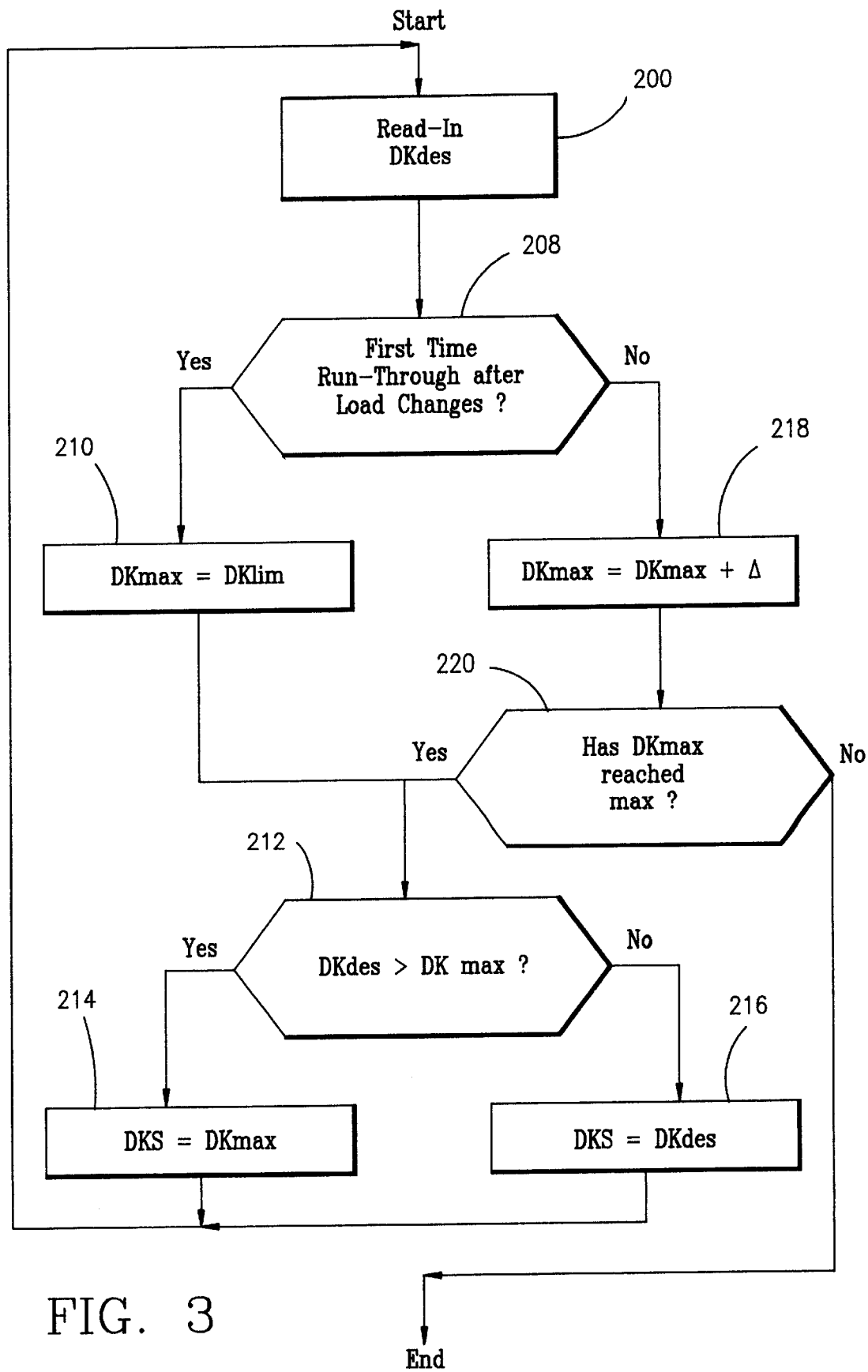
FIG. 3 shows a second preferred embodiment of the method of the invention as a flowchart which shows a realization of the method as a computer program; and, FIGS. 4a to 4d show the operation of the torque limiting in the context of time diagrams.

The program outlined in FIG. 3 is carried out to limit the throttle flap position in the preferred embodiment. This program too is run through at pregiven time points after a change of load is recognized. In step 200, the throttle flap desired value DKdes is read in. The throttle flap desired value DKdes is formed in dependence upon the driver command. In step 208, a check is made as to whether the program is run through for the first time after a change of load. If this is the case, then, in step 210, the maximum value of the throttle flap position DKmax is set to the limiting value DKlim. Thereupon, in step 212, the desired value DKdes, which is pregiven by the driver, is compared to this maximum value. If the desired value exceeds the maximum value, then, in accordance with step 214, the desired value DKS, which is to be outputted, is set to the maximum value DKmax. If the desired value drops below the maximum value, then, in accordance with step 216, the desired value DKS, which is to be outputted, is set to the desired value DKdes pregiven by the driver. Thereafter, the program is ended. In another program, the desired value DKS is outputted to the position controller.

If, in step 208, the result was that the program is not run through for the first time, then, in accordance with step 218, the maximum value DKmax is increased by the value Δ. The step 218 defines the time-dependent change of the limiting value. Thereafter, in accordance with step 220, a check is made as to whether the limit value DKmax has reached a maximum value max. If this is the case, then the program is ended and the program is only run through again after the next change of load. If the maximum value has not yet been reached, then the method is continued in step 212 and the determination of the desired value.

In another embodiment, limiting takes place on the basis of the throttle flap actual value in a similar manner. This is in addition to the illustration of limiting on the basis of the throttle flap position desired value. Correspondingly, limiting is carried out on the basis of the corresponding desired values or actual values in those solutions wherein not the throttle flap position but the torque or output power of the drive unit is pregiven.

Figure 4A:
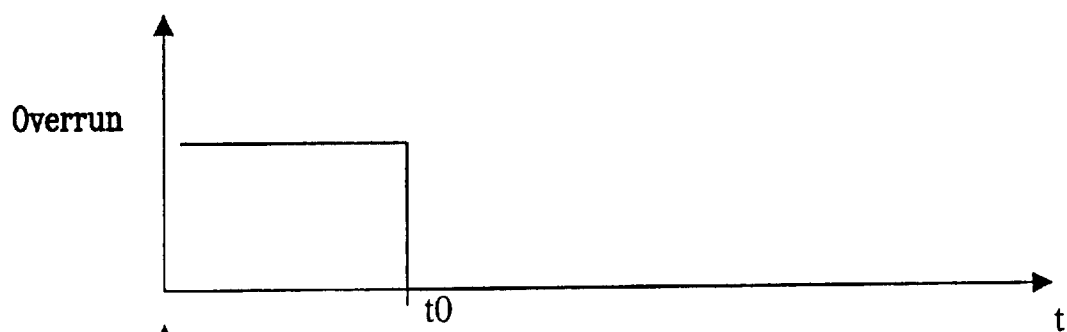
Figure 4B:
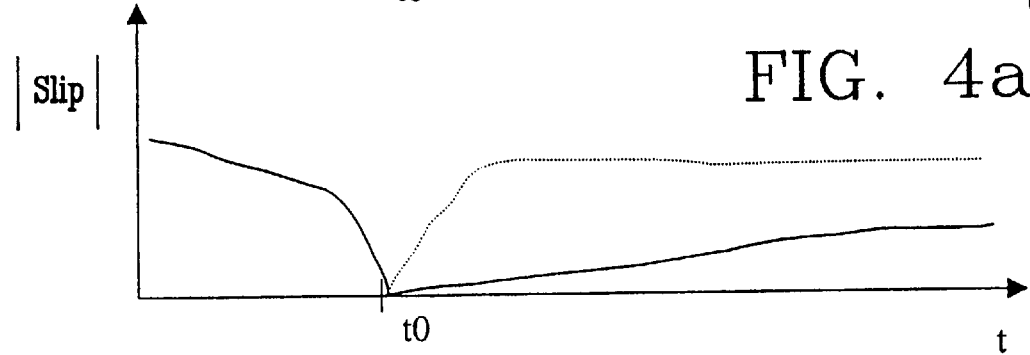
Figure 4C:
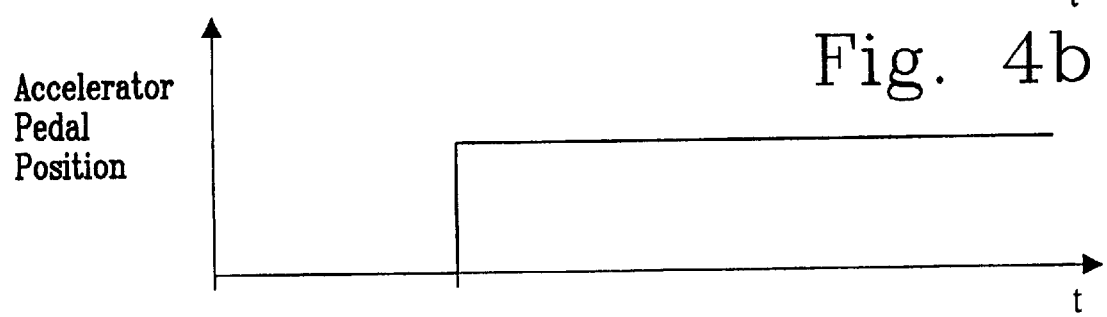
Figure 4D:
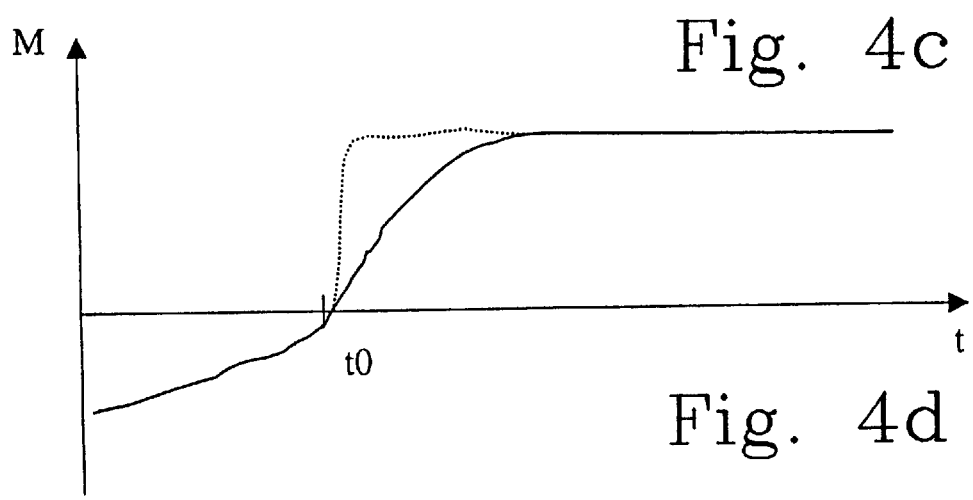

The operation of the described procedure is shown with respect to the time diagrams of FIGS. 4*a* to 4*d*. Here, FIG. 4*a* shows the presence of an overrun phase and FIG. 4*b* shows the time-dependent trace of the amount of the wheel slip. FIG. 4*c* shows the trace of the accelerator pedal position and FIG. 4*d* shows the torque of the drive unit as a function of time.

At first, the vehicle is in the overrun phase. It is assumed that the vehicle travels in the overrun phase (see FIG. 4*a*). A certain drag slip is present in accordance with FIG. 4*b* and the accelerator pedal is released and the torque is negative. At time point t0, the driver actuates the accelerator pedal (see FIG. 4*c*). Correspondingly, and in accordance with FIG. 4*a*, there is a movement out of the overrun phase and the amount of the wheel slip rapidly changes its value. After the time point t0, when the torque crosses the zero line, the amount of the wheel slip drops to the value 0. Without limiting, a large abrupt change of the torque would take place after time point t0 (see FIG. 4*d*, broken line). As a consequence of limiting, a limited increase of the torque takes place after time point t0 up to the torque, which is pregiven by the driver (this is reached at time point t1). The slip trace according to FIG. 4*b* also shows a flatter trace because of the limiting (dotted trace without limiting, solid line trace with limiting).

The determination of the transition from the overrun phase into the traction phase takes place (depending upon the embodiment) as follows: in dependence upon a comparison of the torque to a zero torque characteristic line; in dependence upon a comparison of the throttle flap position to such a characteristic line; and, in dependence upon the accelerator pedal position, et cetera. Here, a transition must not always correspond precisely to the time point at which the torque actually changes from negative to positive values. In this sense, a transition into the traction phase means only a region around this exact transition point.

The same applies when the procedure shown is used with the transition from the idle phase of the drive unit into the traction phase. Here, the slip in the idle phase is determined and a limiting value is correspondingly derived which then limits the magnitude for a direct transition (for example, for a simultaneous engagement of the clutch and a rapid depression of the accelerator pedal). The idle phase is then present when the connection between the drive unit and the drive train is open.

The same applies when the illustrated procedure is applied for the transition from a braking phase of the vehicle to the traction phase. Here, the slip in the braking phase is determined, and, correspondingly, a limiting value is derived which then limits the magnitude for a direct transition (for example, simultaneous engagement of the clutch and rapid deceleration of the accelerator pedal). A braking phase is present when the driver actuates the brake pedal, especially when an ABS intervention is present.

It is understood that the foregoing description is that of the preferred embodiments of the invention and that various changes and modifications may be made thereto without departing from the spirit and scope of the invention as defined in the appended claims.

What is claimed is:

1. A method of controlling a drive unit of a motor vehicle, the method comprising the steps of:
   detecting a variable representing the torque of the drive unit;
   controlling said variable on the basis of a command of the driver of said motor vehicle;
   detecting the slip of at least one drive wheel in one of the following operating phases: overrun phase, idle phase and braking phase;
   determining a limiting value for said variable in dependence upon said slip;
   limiting said variable to said limiting value at or near a transition from one of said operating phases into a traction phase of said drive unit; and,
   applying said slip to determine said limiting value which is present at the end of one of said operating phases ahead of said transition into said traction phase.

2. A method of controlling a drive unit of a motor vehicle, the method comprising the steps of:
   detecting a variable representing the torque of the drive unit;
   controlling said variable on the basis of a command of the driver of said motor vehicle;
   detecting the slip of at least one drive wheel in one of the following operating phases: overrun phase, idle phase and braking phase;

determining a limiting value for said variable in dependence upon said slip;

limiting said variable to said limiting value at or near a transition from one of said operating phases into a traction phase of said drive unit; and, increasing said limiting value in accordance with a pre-given time function.

3. A method of controlling a drive unit of a motor vehicle, said motor vehicle includes drive wheels and a drive train between said drive unit and said drive wheels, the method comprising the steps of:

detecting a variable representing the torque of the drive unit;

controlling said variable on the basis of a command of the driver of said motor vehicle;

detecting the slip of at least one drive wheel in one of the following operating phases: overrun phase, idle phase and braking phase;

determining a limiting value for said variable in dependence upon said slip;

limiting said variable to said limiting value at or near a transition from one of said operating phases into a traction phase of said drive unit;

disengaging a clutch in said drive train of said motor vehicle in said overrun phase;

engaging said clutch at the end of said overrun phase or said idle phase; and, taking the slip present when engaging said clutch as the basis of the determination of said limiting value.

4. A method of controlling a drive unit of a motor vehicle, the method comprising the steps of:

determining a variable representing the torque of the drive unit;

controlling said variable on the basis of a command quantity (DKdes) of the driver of said motor vehicle;

detecting the brake slip at at least one drive wheel in at least one of the following operating phases: overrun phase, idle phase and braking phase;

determining a limit value (DKlim) for said variable in dependence upon said brake slip in at least one of said operating phase; and, limiting said variable to said limit value (DKlim) at a transition from one of said operating phases into a traction phase of said drive unit.

5. The method of claim 4, wherein said variable is selected from the following group: a throttle flap angle, a fuel mass, a torque of said drive unit or a power of said drive unit.

6. The method of claim 4, comprising the further step of determining said limit value (DKlim) in accordance with the magnitude of said brake slip during one of said operating phases on the basis of a characteristic line or a characteristic field.

7. The method of claim 4, comprising the further step of applying said brake slip to determine said limit value (DKlim) which is present at the end of one of said operating phases ahead of said transition into said traction phase.

8. The method of claim 4, comprising the further step of increasing said limit value (DKlim) in accordance with a pregiven time function.

9. The method of claim 4, wherein said motor vehicle includes drive wheels and a drive train between said drive unit and said drive wheels, the method comprising the further steps of:

disengaging a clutch in said drive train of said motor vehicle in said overrun phase;

engaging said clutch at the end of said overrun phase or said idle phase; and, taking the brake slip present when engaging said clutch as the basis of the determination of said limit value (DKlim).

10. An arrangement for controlling a drive unit of a motor vehicle, the arrangement comprising:

means for determining a variable representing the torque of said drive unit;

a control apparatus functioning to control said variable on the basis of a command quantity (DKdes) of the driver of said motor vehicle;

said control apparatus including:

means for detecting the brake slip at at least one drive wheel in at least one of the following operating phases: overrun phase, idle phase and braking phase;

means for providing a limit value (DKlim) for said variable in dependence upon said brake slip in at least one of said operating phases; and, means for limiting said variable to said limit value (DKlim) at a transition from one of said operating phases into a traction phase of said drive unit.

* * * * *